United States Patent
Kanaya et al.

(10) Patent No.: US 9,329,959 B2
(45) Date of Patent: May 3, 2016

(54) DEVICE AND METHOD FOR PERFORMING REGRESSION TESTING ON BIOS BOOT INFORMATION

(71) Applicants: FUJITSU LIMITED, Kawasaki-shi, Kanagawa (JP); FUJITSU ADVANCED ENGINEERING LIMITED, Shinjuku-ku, Tokyo (JP)

(72) Inventors: Manabu Kanaya, Yokohama (JP); Yasushi Sekiguchi, Yokohama (JP); Takashi Ohhashi, Iruma (JP)

(73) Assignees: FUJITSU LIMITED, Kawasaki (JP); FUJITSU ADVANCED ENGINEERING LIMITED, Tokyo (JP)

(*) Notice: Subject to any disclaimer, the term of this patent is extended or adjusted under 35 U.S.C. 154(b) by 283 days.

(21) Appl. No.: 13/970,951

(22) Filed: Aug. 20, 2013

(65) Prior Publication Data

US 2013/0339718 A1    Dec. 19, 2013

Related U.S. Application Data

(63) Continuation of application No. PCT/JP2011/054957, filed on Mar. 3, 2011.

(51) Int. Cl.
*G06F 9/00* (2006.01)
*G06F 9/24* (2006.01)
(Continued)

(52) U.S. Cl.
CPC ............ *G06F 11/22* (2013.01); *G06F 11/1417* (2013.01); *G06F 11/3612* (2013.01); *G06F 11/3688* (2013.01); *G06F 11/3692* (2013.01);
(Continued)

(58) Field of Classification Search
CPC . G06F 9/4401; G06F 9/4406; G06F 11/3476; G06F 11/3612; G06F 11/3072; G06F 11/1417; G06F 11/3692; G06F 9/4408
USPC .................. 713/1, 2; 714/36, 37, 38.1, 45
See application file for complete search history.

(56) References Cited

U.S. PATENT DOCUMENTS

| 6,308,264 B1 | 10/2001 | Rickey |
| 6,449,716 B1 | 9/2002 | Rickey |

(Continued)

FOREIGN PATENT DOCUMENTS

| JP | 11-53214 | 2/1999 |
| JP | 2002-526825 | 8/2002 |

(Continued)

OTHER PUBLICATIONS

International Search Report mailed Apr. 5, 2011 in corresponding International Application No. PCT/JP2011/054957.

*Primary Examiner* — Ji H Bae
(74) *Attorney, Agent, or Firm* — Staas & Halsey LLP

(57) ABSTRACT

A basic input/output system (BIOS) storage unit stores therein a BIOS. An operating system (OS) storage unit stores therein a plurality of OSs. A boot control unit sequentially starts the OSs stored in the OS storage unit. When each of the OSs booted by the boot control unit starts up, a boot information acquisition unit acquires boot information transferred between the OS and the BIOS. A regression analysis processing unit compares the boot information acquired by the boot information acquisition unit with expected values which are predetermined values for the boot information to determine whether the boot information coincides with the expected values.

5 Claims, 15 Drawing Sheets

(51) Int. Cl.
*G06F 11/00* (2006.01)
*G06F 11/22* (2006.01)
*G06F 11/36* (2006.01)
*G06F 11/14* (2006.01)
*G06F 9/44* (2006.01)
*G06F 11/30* (2006.01)
*G06F 11/34* (2006.01)

(52) U.S. Cl.
CPC ............ *G06F 9/4401* (2013.01); *G06F 9/4406* (2013.01); *G06F 9/4408* (2013.01); *G06F 11/3072* (2013.01); *G06F 11/3476* (2013.01)

(56) References Cited

U.S. PATENT DOCUMENTS

| | | | |
|---|---|---|---|
| 2001/0018717 A1* | 8/2001 | Shimotono | 709/319 |
| 2004/0003222 A1* | 1/2004 | Rich et al. | 713/1 |
| 2007/0174689 A1* | 7/2007 | Chen | 714/13 |
| 2008/0201610 A1* | 8/2008 | Chen et al. | 714/36 |
| 2013/0117006 A1* | 5/2013 | Varghese et al. | 703/22 |

FOREIGN PATENT DOCUMENTS

| | | |
|---|---|---|
| JP | 2005-122410 | 5/2005 |
| JP | 2007-241616 | 9/2007 |
| WO | WO 00/19310 A2 | 4/2000 |

\* cited by examiner

FIG.5

| ITEM | DESCRIPTION |
|---|---|
| FIRST BOOT FLAG | FLAG TO DETERMINE WHETHER BOOTING IS TO BE PERFORMED FOR FIRST TIME<br>VALUE IS INITIALLY 0, AND CHANGES TO 1 ONCE BOOTING IS PERFORMED |
| NUMBER OF CONNECTED BOOTABLE HDDs | NUMBER OF BOOTABLE HDDs CONNECTED TO SERVER DEVICE |
| NUMBER OF BOOT COMPLETE HDDs | NUMBER OF HDDs FROM WHICH BOOTING IS COMPLETED |
| HDD BOOT MODE FLAG | FLAG TO DETERMINE WHETHER TO PERFORM BOOTING FROM HDD TO BOOT FROM<br>VALUE IS INITIALLY 0 INDICATING THAT BOOTING IS NOT TO BE PERFORMED BUT TO BE PREPARED TO START<br>VALUE OF 1 INDICATES THAT BOOTING IS TO BE PERFORMED FROM HDD TO BOOT FROM |
| HDD RECOGNITION PRIORITY TABLE | INFORMATION INDICATING ORDER IN WHICH BIOS RECOGNIZES CONNECTED BOOTABLE HDDs |
| NUMBER OF SUCCESSIVE BOOTS | INFORMATION INDICATING HOW MANY TESTS ARE TO BE REPEATED ON ASSUMPTION THAT OS BOOT IS TO BE PERFORMED ONCE FROM EVERY BOOTABLE HDD IN EACH TEST<br>FOR EXAMPLE, SETTING OF 1 CAUSES BOOTING TO BE PERFORMED ONCE USING EVERY HDD |

FIG.6

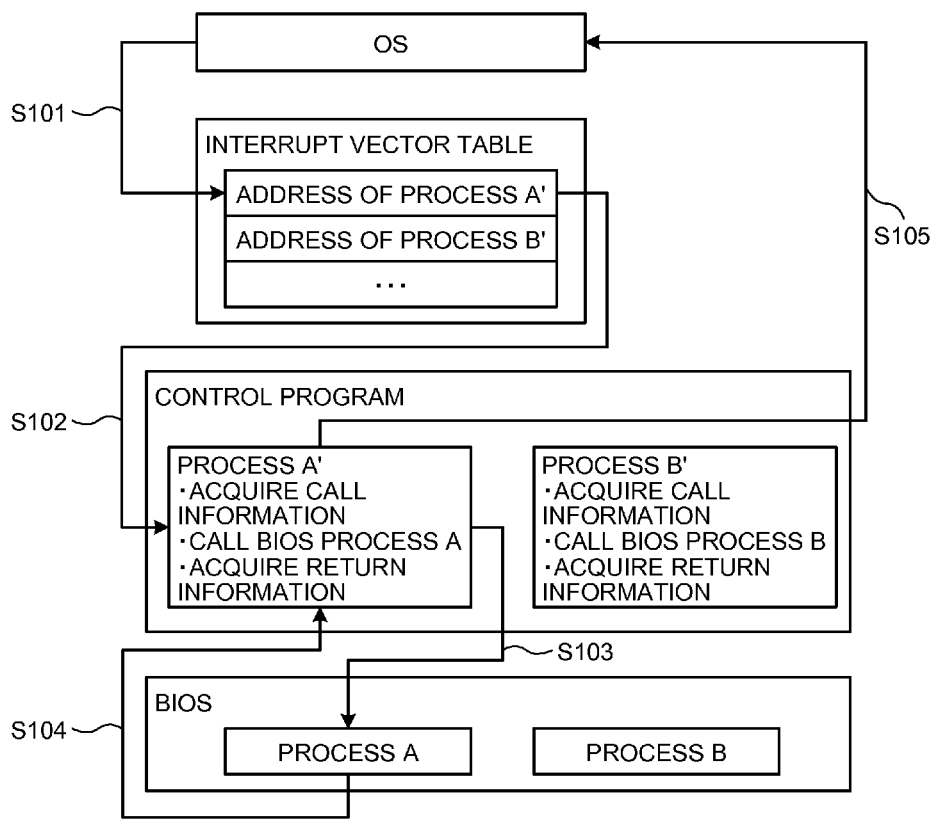

FIG.17

| ITEM | DESCRIPTION |
|---|---|
| FIRST BOOT FLAG | FLAG TO DETERMINE WHETHER BOOTING IS TO BE PERFORMED FOR FIRST TIME<br>VALUE IS INITIALLY 0, AND CHANGES TO 1 ONCE BOOTING IS PERFORMED |
| NUMBER OF CONNECTED BOOTABLE HDDs | NUMBER OF BOOTABLE HDDs CONNECTED TO SERVER DEVICE |
| NUMBER OF BOOT COMPLETE HDDs | NUMBER OF HDDs FROM WHICH BOOTING IS COMPLETED |
| HDD RECOGNITION PRIORITY TABLE | INFORMATION INDICATING ORDER IN WHICH BIOS RECOGNIZES CONNECTED BOOTABLE HDDs |
| NUMBER OF SUCCESSIVE BOOTS | INFORMATION INDICATING HOW MANY TESTS ARE TO BE REPEATED ON ASSUMPTION THAT OS BOOT IS TO BE PERFORMED ONCE FROM EVERY BOOTABLE HDD IN EACH TEST<br>FOR EXAMPLE, SETTING OF 1 CAUSES BOOTING TO BE PERFORMED ONCE USING EVERY HDD |

FIG.18

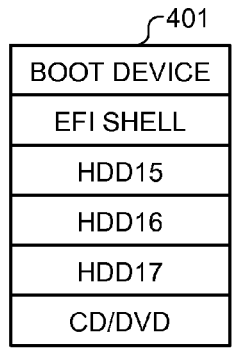

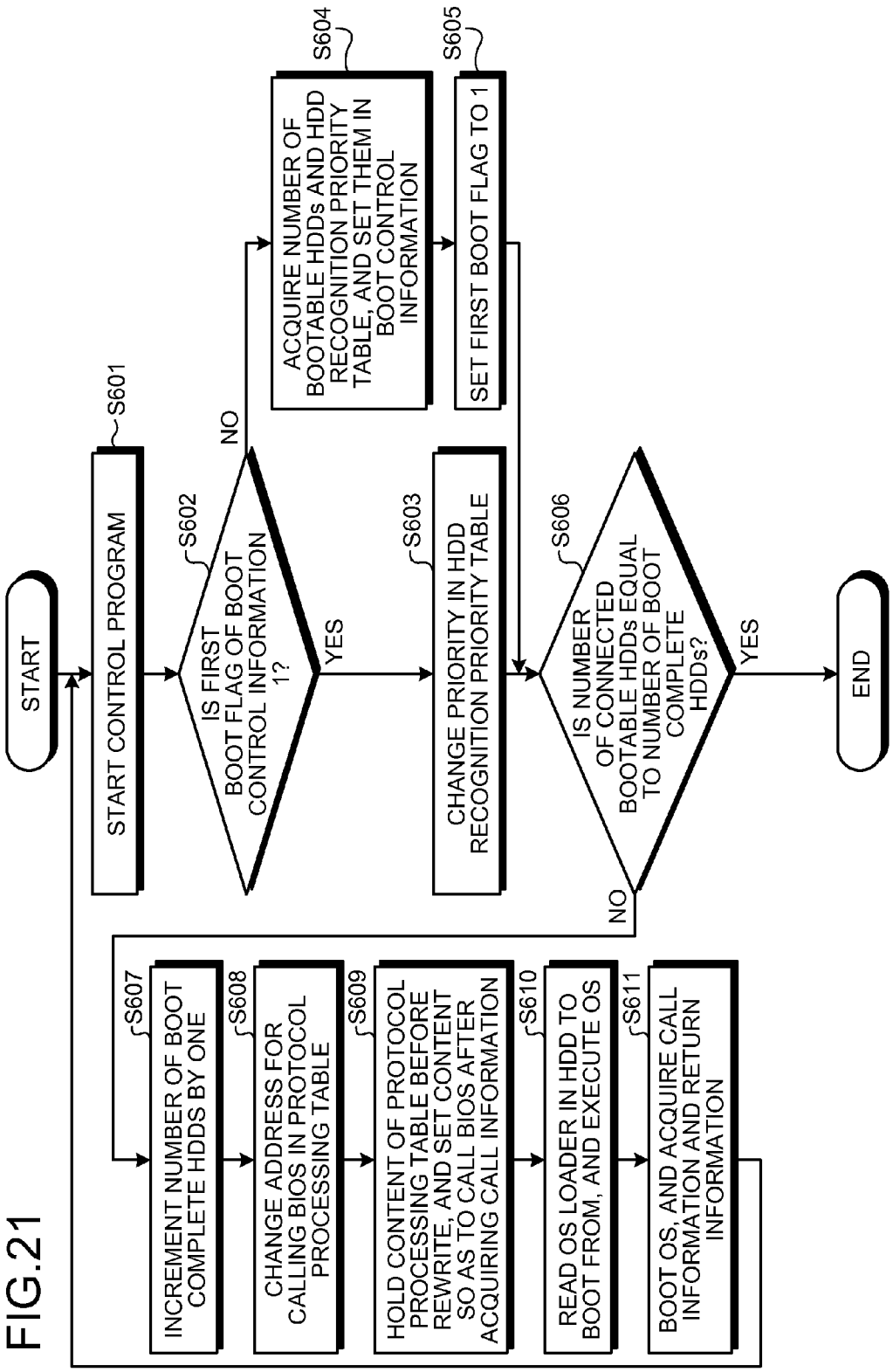

DEVICE AND METHOD FOR PERFORMING REGRESSION TESTING ON BIOS BOOT INFORMATION

CROSS-REFERENCE TO RELATED APPLICATION

This application is a continuation of International Application No. PCT/JP2011/054957, filed on Mar. 3, 2011, the entire contents of which are incorporated herein by reference.

FIELD

The embodiments discussed herein are directed to an information processing device and a method for controlling an information processing device.

BACKGROUND

Developing a basic input/output system (BIOS) of a computer such as a server device involves an operation check test of the BIOS. The operation check test of the BIOS checks booting of an operating system (OS) supported by the computer. The OS, when booted, performs processes such as examining states of hardware units such as a memory available for the OS to use, and reading data used for the booting of the OS from a hard disc drive (HDD). When performing these processes, the OS calls BIOS functions to examine the state of use of the memory and connection states of hardware units, and to read the data from the HDD.

The process in calling the BIOS functions when the OS is booted differs between types of the OS. The booting of every type of OS is checked to check the operation of the BIOS with respect to a plurality of types of OSs.

In the development of the BIOS, the BIOS is modified or changed to deal with bugs that have occurred during the operation check. It is also requested to further check whether the change or the modification is correctly reflected in the BIOS. After the bugs are fixed, the operation check is performed based on the BIOS whose bugs have been fixed. In the operation check after the bug fix, the booting of all of the OSs supported by the computer needs to be checked to ensure that the fixing does not affect the operation. Such an operation check after the bug fix is hereinafter called a "regression test".

In general, the regression test ensures that a partial functional change or the bug fix in the BIOS does not affect other unchanged functions of the BIOS. In the booting of the OS, the BIOS function is called during a period before an OS loader starts. Therefore, the behavior caused by the calling of the BIOS function is checked by a specialist by checking screen information and/or by temporarily halting the booting and tracing the BIOS call, using a hardware debugger. In this manner, in the regression test, the booting operation of the OS is conventionally checked by visually checking the behavior.

There are the following two methods for conducting the regression test for a plurality of OSs: One is a method in which the test is conducted with a hard disk to be connected being switched. This is a method in which the OSs are installed on different HDDs, and an operator switches the HDDs to be connected to boot, and thus checks the operation of the BIOS in booting of the different OSs. In this case, the regression test of the BIOS is conducted by visually checking the behavior while temporarily halting the calling of the BIOS using the hardware debugger.

The other method is a method in which all of the HDDs on which different OSs are installed are connected, and the operator sequentially changes the HDDs to boot through the setting of the BIOS. Also, in this case, the regression test of the BIOS is conducted by visually checking the behavior while temporarily halting the calling of the BIOS using the hardware debugger.

In addition, a technique has been developed in which a device having a higher priority boots an OS of a device having a lower priority.

Patent Document 1: Japanese Laid-open Patent Publication No. 2005-122410

However, to boot a plurality of OSs in the conventional regression tests of the BIOS, the operator performs operations such as switching the hard disks to be connected and changing the setting of the BIOS. Thus, much time and efforts are required. In addition, the behavior in the booting of the OS is checked by visual check of the operator. This also requires much time and efforts.

SUMMARY

According to an aspect of an embodiment, an information processing device includes a basic input/output system (BIOS) storage unit that stores therein a BIOS; an operating system (OS) storage unit that stores therein a plurality of OSs; a boot control unit that sequentially boots the OSs stored in the OS storage unit; a boot information acquisition unit that, when each of the OSs booted by the boot control unit starts up, acquires boot information transferred between the booted OS and the BIOS; and a regression analysis processing unit that compares the boot information acquired by the boot information acquisition unit with expected values which are predetermined values for the boot information to determine whether the boot information coincides with the expected values.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 5 is a diagram illustrating examples of items and descriptions thereof listed in boot control information according to the first embodiment;

FIG. 6 is a diagram for explaining a priority change in an HDD recognition priority table;

FIG. 9 is a diagram illustrating an example of the comparison result log;

FIG. 10 is a diagram for explaining an example of an acquisition process of the call information and the return information;

FIG. 17 is a diagram illustrating examples of items and descriptions thereof listed in boot control information according to the second embodiment;

FIG. 18 is a diagram of an example of a boot device sequence table in an OS that supports the Unified Extensible Firmware Interface (UEFI);

FIG. 21 is a flowchart of a process to boot OSs with an HDD to boot being sequentially switched in the second embodiment.

DESCRIPTION OF EMBODIMENTS

Preferred embodiments of the present invention will be explained with reference to accompanying drawings. Note that the embodiments given below do not limit the information processing device and the method for controlling an information processing device disclosed by the present application.

[a] First Embodiment

Figure 1:
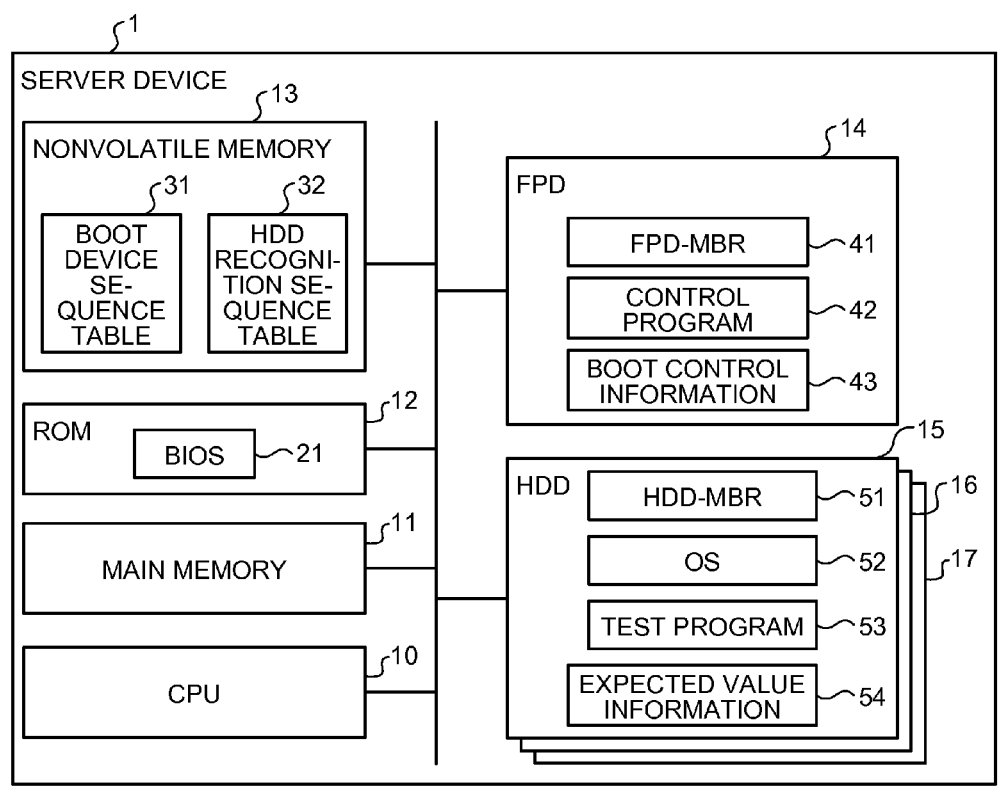
FIG. 1 is a configuration diagram of an information processing device according to a first embodiment of the present invention.

A description will be made below of an information processing device according to a first embodiment of the present invention by way of an example of a server device. However, the information processing device is not limited to the server device, but may be another device, such as a client device, if it is a computer. FIG. 1 is a configuration diagram of the server device according to the first embodiment. A description will be made here, using FIG. 1, of an outline of the configuration of this server device 1 and of information stored therein.

The server device 1 includes a CPU 10, a main memory 11, a read-only memory (ROM) 12, a nonvolatile memory 13, a floppy (registered trademark) disk drive (FPD) 14, and HDDs 15 to 17. The nonvolatile memory 13 may also be called "CMOS".

The ROM 12 stores therein a BIOS 21. The nonvolatile memory 13 stores therein a boot device sequence table 31 and an HDD recognition sequence table 32. The FPD 14 stores therein an FPD master boot record (FPD-MBR) 41, a control program 42, and boot control information 43. The HDD 15 stores therein an HDD-MBR 51, an OS 52, a test program 53, and expected value information 54. The HDDs 16 and 17 each store therein the HDD-MBR, an OS, the test program, and the expected value information in the same manner as the HDD 15. The OSs stored in the HDDs 15, 16, and 17 differ from one another.

Figure 2:
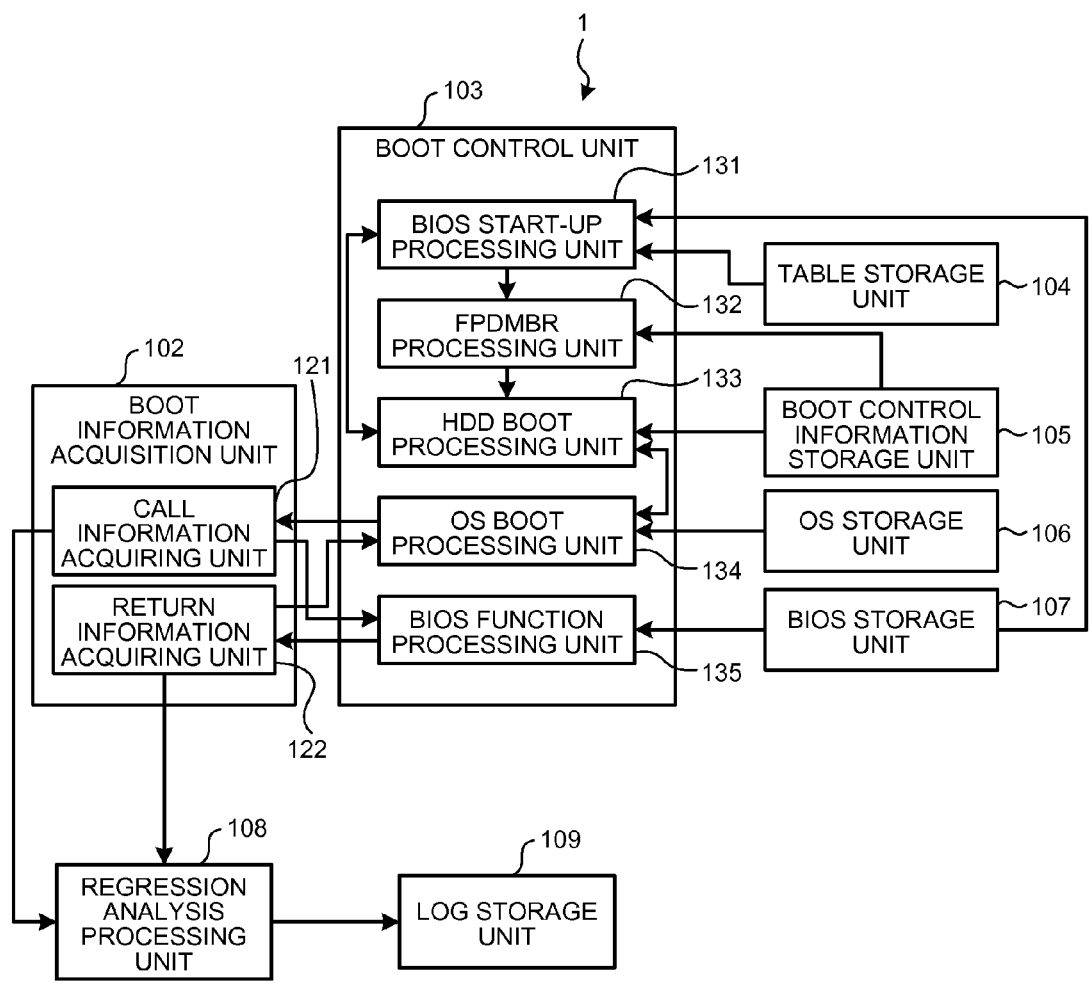
FIG. 2 is a block diagram of the information processing device according to the first embodiment.

FIG. 2 is a block diagram illustrating functions of the server device according to the first embodiment. A description will be made of the functional configuration of the server device 1 and operations of various units, using FIG. 2. As illustrated in FIG. 2, the server device 1 according to the present embodiment includes a boot information acquisition unit 102, a boot control unit 103, a table storage unit 104, a boot control information storage unit 105, an OS storage unit 106, a BIOS storage unit 107, a regression analysis processing unit 108, and a log storage unit 109.

The OS storage unit 106 is a storage unit that stores therein various OSs. The OS storage unit 106 corresponds, for example, to the HDDs 15 to 17 of FIG. 1. In the present embodiment, the OS storage unit 106 stores therein three different OSs.

The BIOS storage unit 107 stores therein a BIOS. The BIOS storage unit 107 corresponds, for example, to the ROM 12 of FIG. 1.

The table storage unit 104 stores therein the boot device sequence table 31 and the HDD recognition sequence table 32. The table storage unit 104 corresponds, for example, to the nonvolatile memory 13 of FIG. 1.

Figure 3:
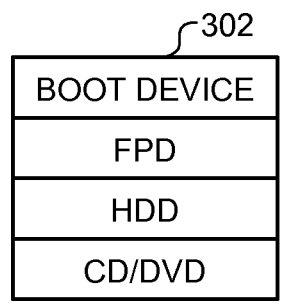
FIG. 3 is a diagram of an example of a boot device sequence table.

The boot device sequence table 31 is a table that lists data for controlling the boot sequence of devices booted by the BIOS 21. FIG. 3 is a diagram of an example of the boot device sequence table. As illustrated in FIG. 3, the boot device sequence table has a column 302 that represents the devices and indicates that the order of booting is higher upward as viewed facing FIG. 3. As illustrated in FIG. 3, the boot device sequence table 31 sets the FPD to be the device at the highest booting order in the column 302, thus making a setting so as to perform booting from the FPD 14.

Figure 4:
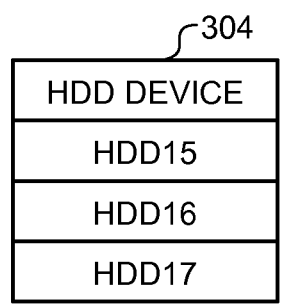
FIG. 4 is a diagram of an example of an HDD recognition sequence table.

The HDD recognition sequence table 32 is a table that lists an order of boot priorities of the HDDs 15 to 17 booted by the BIOS 21. Specifically, when the BIOS 21 performs booting from an HDD, the BIOS 21 starts the HDD having the highest priority in the HDD recognition sequence table 32. FIG. 4 is a diagram of an example of the HDD recognition sequence table. As illustrated in FIG. 4, the HDD recognition sequence table 32 has a column 304 that represents the HDD devices and indicates that the order of recognition of the HDD is higher upward as viewed facing FIG. 4.

The boot control information storage unit 105 stores therein the boot control information 43. The boot control information storage unit 105 corresponds, for example, to the FPD 14 of FIG. 1.

The boot control information 43 is information on parameters for controlling the booting of the OSs. FIG. 5 is a diagram illustrating examples of items and descriptions thereof listed in the boot control information according to the first embodiment. As illustrated in FIG. 5, the boot control information according to the present embodiment lists a "first boot flag", a "number of connected bootable HDDs", a "number of boot complete HDDs", an "HDD boot mode flag", an "HDD recognition priority table", and a "number of successive boots".

The "first boot flag" is a flag that determines whether booting is to be performed for the first time. The initial value of the "first boot flag" is "0", and the value changes to "1" once booting is performed. In other words, the value 0 of the "first boot flag" indicates that booting is to be performed for the first time, and the value 1 of the "first boot flag" indicates that booting has been performed at least once.

The "number of connected bootable HDDs" is a number of bootable HDDs connected to the server device 1. This is information written by an HDD boot processing unit 133, as will be described later.

The "number of boot complete HDDs" is a number of HDDs whose booting is completed. This is also information written by the HDD boot processing unit 133, as will be described later.

The "HDD boot mode flag" is a flag that determines whether to perform booting from an HDD to boot. The initial value of the "HDD boot mode flag" is "0", and the value changes to "1" if booting is to be performed from the HDD to boot. In other words, the value 0 of the "HDD boot mode flag" indicates that a preparation for booting is to be performed, but the booting is not to be executed. The value 1 of the "HDD boot mode flag" indicates that booting is to be performed from the HDD to boot.

The "HDD recognition priority table" is information indicating the order in which the BIOS recognizes the connected bootable HDDs. This is information written by the HDD boot processing unit 133, as will be described later.

The "number of successive boots" is information that indicates how many tests are to be repeated on the assumption that an OS boot is to be executed once from every bootable HDD in each of the tests. When the "number of successive boots" is set, for example, to 1, the boot is executed once from each of the HDDs. When the "number of successive boots" is set, for example, to 0, the boot using each of the HDDs is executed until a stop command is received.

The boot control unit 103 includes a BIOS start-up processing unit 131, an FPDMBR processing unit 132, the HDD boot processing unit 133, an OS boot processing unit 134, and a BIOS function processing unit 135.

After the server device 1 is powered on, the BIOS start-up processing unit 131 starts the BIOS 21 stored in the BIOS storage unit 107. Then, the BIOS start-up processing unit 131 determines, with reference to the boot device sequence table 31 stored in the table storage unit 104, the device to boot first. Here, the BIOS start-up processing unit 131 determines to perform booting from the FPD 14 because the boot device sequence table 31 defines that the booting is to be performed first from the FPD as illustrated in FIG. 3. Then, the BIOS start-up processing unit 131 starts the boot process from the FPD 14. The BIOS start-up processing unit 131 calls the FPDMBR processing unit 132.

In addition, the BIOS start-up processing unit 131 receives, from the HDD boot processing unit 133, a request for acquisition of the number of bootable HDDs and the HDD recognition sequence table 32. The BIOS start-up processing unit 131 then acquires the number of bootable HDDs by, for example, checking the HDD-MBRs of the HDDs 15 to 17 (such as the HDD-MBR 51 of the HDD 15). In the present embodiment, the BIOS start-up processing unit 131 acquires 3 as the number of bootable HDDs because all of the three HDDs 15 to 17 are the bootable HDDs. The BIOS start-up processing unit 131 also acquires the HDD recognition sequence table 32 stored in the table storage unit 104. The BIOS start-up processing unit 131 outputs, to the HDD boot processing unit 133, the number of bootable HDDs and the HDD recognition sequence table 32 that have been acquired.

The BIOS start-up processing unit 131 also receives, from the HDD boot processing unit 133, an input of a changed order of boot priorities of the HDDs. The BIOS start-up processing unit 131 then rewrites the order of boot priorities of the HDDs in the HDD recognition sequence table 32 stored in the table storage unit 104 to the received order of boot priorities of the HDDs. The BIOS start-up processing unit 131 corresponds, for example, to the BIOS 21 executed by the CPU 10 in FIG. 1.

The FPDMBR processing unit 132 calls the HDD boot processing unit 133. The FPDMBR processing unit 132 corresponds, for example, to the FPD-MBR 41 executed by the CPU 10 in FIG. 1.

The HDD boot processing unit 133 checks the "HDD boot mode flag" of the boot control information 43 stored in the boot control information storage unit 105 to determine whether to perform booting from the HDD to boot. In this determination, the HDD boot processing unit 133 determines not to perform booting from the HDD if the value of the "HDD boot mode flag" is 0, and determines to perform booting from the HDD if the value of the "HDD boot mode flag" is 1.

When having determined not to perform booting from the HDD, the HDD boot processing unit 133 checks the "first boot flag" of the boot control information 43 stored in the boot control information storage unit 105 to determine whether booting is to be performed for the first time. In this determination, the HDD boot processing unit 133 determines that booting is to be performed for the first time if the value of the "first boot flag" is 0, and determines that booting is to be performed for the second time or later if the value of the "first boot flag" is 1.

If booting is to be performed for the first time, the HDD boot processing unit 133 sends, to the BIOS start-up processing unit 131, a request for acquisition of HDD information including the number of bootable HDDs and the HDD recognition sequence table 32. Then, the HDD boot processing unit 133 acquires the HDD information including the number of bootable HDDs and the HDD recognition sequence table 32 from the BIOS start-up processing unit 131. In the present embodiment, the HDD boot processing unit 133 acquires 3 as the number of bootable HDDs because the three HDDs 15 to 17 are the bootable HDDs. In the present embodiment, the HDD boot processing unit 133 also acquires the HDD recognition sequence table 32 illustrated in FIG. 4. The HDD boot processing unit 133 then registers the number of bootable HDDs and the HDD recognition sequence table 32 that have been acquired into the boot control information 43 stored in the boot control information storage unit 105. In the present embodiment, the HDD boot processing unit 133 registers 3 as the "number of connected bootable HDDs" of the boot control information 43. The HDD boot processing unit 133 also registers the HDD recognition sequence table 32 illustrated in FIG. 4 as the "HDD recognition priority table" of the boot control information 43.

If, instead, booting is to be performed for the second time or later, the HDD boot processing unit 133 changes the order of boot priorities of the HDDs of the HDD recognition priority table, with reference to the boot control information 43 stored in the boot control information storage unit 105. The HDD boot processing unit 133 then notifies the BIOS start-up processing unit 131 of the change in the order of boot priorities of the HDDs.

A description will be made here of the change in the order of boot priorities of the HDDs by the HDD boot processing unit 133. FIG. 6 is a diagram for explaining the priority change in the HDD recognition priority table. A table 305 of FIG. 6 illustrates the order of priorities before being changed. A table 306 of FIG. 6 illustrates the order of priorities after being changed. Both of the tables 305 and 306 indicate that the priority of the hard disk is higher leftward as viewed facing FIG. 6. The symbol "0" in the tables 305 and 306 represents that no corresponding hard disk is available. In other words, in the present embodiment, only the three HDDs 15 to 17 are available as bootable hard disks, and therefore, "0" is placed in the fields except in three fields on the higher priority side in each of the tables 305 and 306.

For example, in the case of changing the order of priorities when the priorities are assigned as illustrated in the table 305, the HDD boot processing unit 133 shifts the HDD 15 having the highest priority to a place of the third priority. In addition, the HDD boot processing unit 133 shifts the places of the HDDs 16 and 17 having the second and the third priorities, respectively, by one step each toward a place of higher priority. With this operation, the HDD boot processing unit 133 can change the order of priorities from that of the table 305 to that of the table 306.

If booting is to be performed for the first time, the HDD boot processing unit 133 sets the value of the "first boot flag" to 1, and then determines whether the value of the "number of connected bootable HDDs" coincides with the value of the "number of boot complete HDDs" in the boot control information 43. If booting is to be performed for the second time or later, the HDD boot processing unit 133 changes the boot priorities of the HDDs, and then determines whether the value of the "number of connected bootable HDDs" coincides with the value of the "number of boot complete HDDs" in the boot control information 43. If the value of the "number of connected bootable HDDs" coincides with the value of the "number of boot complete HDDs", the HDD boot processing unit 133 terminates the boot process of the OSs. If, instead, the value of the "number of connected bootable HDDs" does not coincide with the value of the "number of boot complete HDDs", the HDD boot processing unit 133 changes the "HDD boot mode flag" to 1, and reboots the server device 1.

When the "HDD boot mode flag" of the boot control information 43 is 1, the HDD boot processing unit 133 specifies, with reference to the "HDD recognition priority table" of the boot control information 43, the HDD having the highest priority as the HDD to boot. The HDD boot processing unit 133 then instructs the OS boot processing unit 134 to perform booting from the specified HDD to boot.

Then, the HDD boot processing unit 133 changes the "HDD boot mode flag" of the boot control information 43 to 0.

The HDD boot processing unit 133 increments the "number of boot complete HDDs" in the boot control information 43 by one immediately before instructing the OS boot processing unit 134 to perform booting from the specified HDD to boot. The HDD boot processing unit 133 corresponds, for example, to the control program 42 executed by the CPU 10 in FIG. 1.

The OS boot processing unit 134 receives, from the HDD boot processing unit 133, the specification of the HDD to boot and the instruction of booting from the HDD. Then, the OS boot processing unit 134 boots an OS from the specified HDD.

The OS boot processing unit 134 stores in advance correspondences between processes specified in calls for BIOS functions called by the OS and processes included in a call information acquiring unit 121 to be described later. For example, the OS boot processing unit 134 stores correspondences such as a correspondence of a process A' in the call information acquiring unit 121 to a process A in the BIOS, and a correspondence of a process B' in the call information acquiring unit 121 to a process B in the BIOS.

Figure 7:
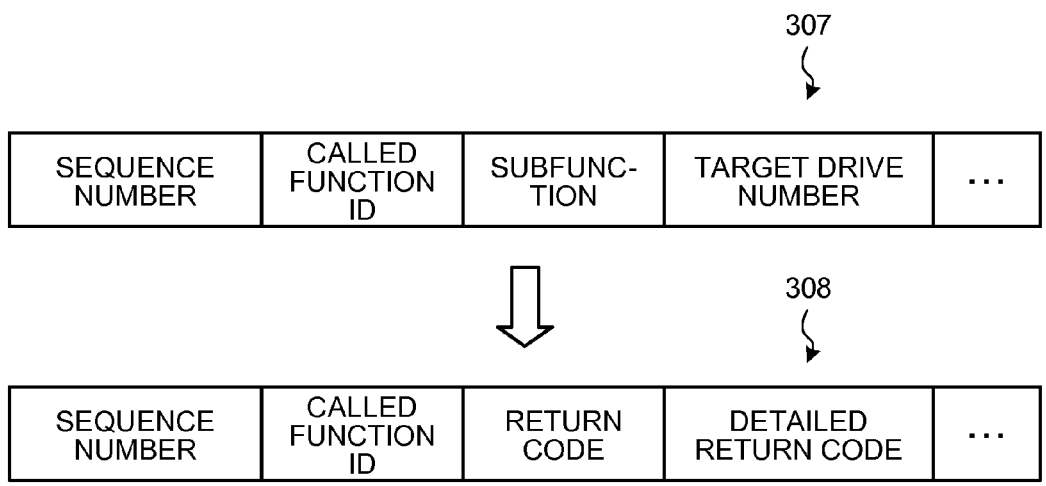
FIG. 7 is a diagram for explaining an example of call information and return information.

Then, the OS boot processing unit 134 receives, from the booted OS, the calls of the BIOS functions along with call information. The call information is a set of parameters and a sequence number that are sent to the BIOS when the OS calls the BIOS function. FIG. 7 is a diagram for explaining an example of the call information and return information. A data sequence 307 represents the call information. A data sequence 308 represents the return information. As illustrated in the data sequence 307, the call information includes the sequence number, a called function ID, a subfunction, a target drive number, etc. The sequence number is a serial number beginning from 0. The called function ID is a number for a software interrupt. The subfunction is a number for further specifying a process in a certain software interrupt. The called function ID and the subfunction specify a BIOS process that is called. The target drive number is an identifier of a hard disk that stores therein the BIOS function that is called.

The OS boot processing unit 134 specifies a process of the call information acquiring unit 121 corresponding to the called BIOS process stored in the OS boot processing unit 134. Then, the OS boot processing unit 134 calls the specified process of the call information acquiring unit 121. Then, the OS boot processing unit 134 outputs the call information to the call information acquiring unit 121. For example, when having received a call of the BIOS process A from the OS, the OS boot processing unit 134 calls the process A' of the call information acquiring unit 121. Thereafter, the OS boot processing unit 134 receives an input of the return information from the call information acquiring unit 121. Then, the OS boot processing unit 134 continues to boot the OS.

When the boot of the OS has finished, the OS boot processing unit 134 notifies the HDD boot processing unit 133 of the completion of the OS boot. The OS boot processing unit 134 corresponds, for example, to the control program 42 executed by the CPU 10 in FIG. 1.

The boot information acquisition unit 102 includes the call information acquiring unit 121 and a return information acquiring unit 122. The call information and the return information may be hereinafter collectively called boot information. The boot information acquisition unit 102 corresponds, for example, to the control program 42 executed by the CPU 10 in FIG. 1.

The call information acquiring unit 121 stores processes corresponding to BIOS processes. This correspondence coincides with the correspondence between the BIOS processes stored in the OS boot processing unit 134 and the processes of the call information acquiring unit 121. For example, the call information acquiring unit 121 includes the process A' corresponding to the BIOS process A and the process B' corresponding to the BIOS process B. The processes included in the call information acquiring unit 121 are processes that call BIOS processes corresponding thereto. For example, the process A' is a process that calls the BIOS process A.

The call information acquiring unit 121 receives a call of a process included in the call information acquiring unit 121 along with the call information from the OS boot processing unit 134. The call information acquiring unit 121 stores the received call information. Then, the call information acquiring unit 121 sends the call information to the BIOS function processing unit 135, and calls a BIOS process corresponding to its own process that has been called.

The return information acquiring unit 122 receives the return information from the BIOS function processing unit 135. The return information acquiring unit 122 stores the received return information. Then, the return information acquiring unit 122 sends the return information to the OS boot processing unit 134, and returns the process to the OS boot processing unit 134.

The BIOS function processing unit 135 receives the call of the BIOS process along with the call information from the call information acquiring unit 121. The BIOS function processing unit 135 executes the specified BIOS process. The BIOS function processing unit 135 outputs the return information generated by the BIOS process to the return information acquiring unit 122. A description will be made here of an example of the return information, using FIG. 7. As illustrated in the data sequence 308, the return information includes a sequence number, the called function ID, a return code, and a detailed return code. The sequence number of the return information is a "sequence number in the data sequence 307 of the corresponding call information+1". The called function ID is the same as the called function ID of the sequence number in the data sequence 307 of the corresponding call information. The return code is a value indicating whether the process has resulted in an error. A detailed code of the error is written as the detailed return code. The BIOS function processing unit 135 corresponds, for example, to the BIOS 21 executed by the CPU 10 in FIG. 1.

The regression analysis processing unit 108 stores in advance expected values of the call information used when the OS calls each of the BIOS processes. The expected values of the call information refer to call information that includes, for example, a content used when a call of the BIOS is normally executed from the OS. In other words, using call information different from the expected values means that the call of the BIOS is not normally executed from the OS. The regression analysis processing unit 108 also stores in advance expected values of the return information used when the BIOS completes the called process and returns control to the OS. The expected values of the return information refer to return information that includes, for example, a content used when control is normally returned from the BIOS to the OS. In other words, using return information different from the expected values means that control is not normally returned from the BIOS to the OS.

The regression analysis processing unit 108 compares the call information and the return information acquired by the call information acquiring unit 121 and the return information acquiring unit 122 with the expected values of the call information and the expected values of the return information that are stored in the regression analysis processing unit 108. If the call information and the return information acquired by the call information acquiring unit 121 and the return information acquiring unit 122 do not respectively coincide with the expected values thereof, the regression analysis processing unit 108 determines that regression has occurred. When having determined that regression has occurred, the regression analysis processing unit 108 creates a comparison result log indicating a comparison result, and stores the comparison result log in the log storage unit 109. The regression analysis processing unit 108 corresponds, for example, to the test program 53 executed by the CPU 10 of FIG. 1. The log storage unit 109 corresponds, for example, to the HDDs 15 to 17 of FIG. 1.

Figure 8:
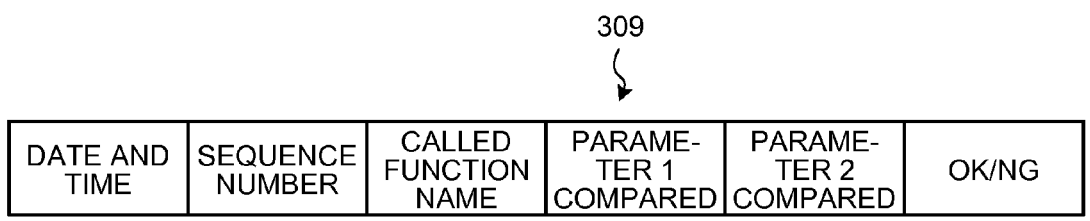
FIG. 8 is a diagram illustrating an example of a format of a comparison result log.

FIG. 8 is a diagram illustrating an example of a format of the comparison result log. FIG. 9 is a diagram illustrating an example of the comparison result log.

The regression analysis processing unit 108 stores a format 309 of the comparison result log such as the one illustrated in FIG. 8. In the present embodiment, the format 309 of the comparison result log has fields for a date and time when the comparison is made, sequence numbers of the pieces of information compared, a called function name, values of compared parameters, and a comparison result. The regression analysis processing unit 108 uses the format 309 stored therein to create the comparison result log as illustrated in FIG. 9. Based on the comparison result. Based on the format 309, the regression analysis processing unit 108 lists, in the comparison result log, the date and time when the comparison is made, the sequence numbers of the pieces of information compared, the called function name, the values of the compared parameters, and the comparison result, each time the comparison is made, as illustrated in FIG. 9. In addition, if the comparison result is abnormal, that is, if the call information or the return information that has been acquired does not coincide with the expected values thereof, the regression analysis processing unit 108 lists the expected values and the actually acquired information, as illustrated in an area 310 enclosed by a dotted line. By checking the comparison result log, an operator, such as a developer, of the BIOS can easily check whether regression has occurred when a BIOS function is called, and what type of error has occurred in the regression, if occurred. This allows the operator to correct the BIOS quickly.

A description will next be made of an overall procedure of acquiring the call information and the return information, with reference to FIG. 10. FIG. 10 is a diagram for explaining an example of the acquisition process of the call information and the return information. Portions enclosed by solid-line rectangles in FIG. 10 represent objects that operate and processes performed by the objects. FIG. 10 illustrates a case in which an OS calls the process A serving as a function of the BIOS. In the description below, for convenience of explanation, the computer programs (such as the OS) directly give and receive data and instructions to/from each other. However, the data and the instructions are actually given and received between the programs via the CPU 10.

First, an OS executes a boot process, and, while executing the boot process, calls the process A that executes a function of the BIOS. Specifically, the OS calls the process A using a software interrupt to the BIOS. There is an interrupt vector for the OS to perform the software interrupt. An address of the BIOS process called by the OS is written in the interrupt vector. In other words, the OS performs the call so as to transfer control to the process specified by the address written in the interrupt vector (Step S101). Here, the control program rewrites the address of the BIOS process preset in the interrupt vector to an address of a process to acquire the boot information and to call the BIOS process. In this case, the control program rewrites the address to the address of the process A' as a process corresponding to the called process A.

To call the process A, the OS refers to the address in the interrupt vector table corresponding to the specified software interrupt. As described above, the address of the process A of the interrupt vector is changed to that of the process A'. Therefore, the OS acquires the address of the process A' listed in the interrupt vector table, corresponding to the software interrupt leading to the process A. Then, the OS determines that the acquired address of the interrupt vector points to the process A' of the control program, and transfers control to the process A' of the control program (Step S102).

Then, the control program executes its own process A'. This process A' includes the acquisition of the call information, the call of the BIOS process A, and the acquisition of the return information. Here, the process A' executed by the control program performs an operation from a step of acquiring the call information to a later step of calling the BIOS process A (Step S103).

The BIOS executes the called process A. After the process A is completed, the BIOS sends the return information to the process A' of the control program (Step S104).

The process A' of the control program acquires the return information received from the BIOS. Furthermore, the process A' of the control program sends the return information thereof to the OS, and transfers control to the OS, which, in turn, continues the boot process (Step S105).

Figure 11:
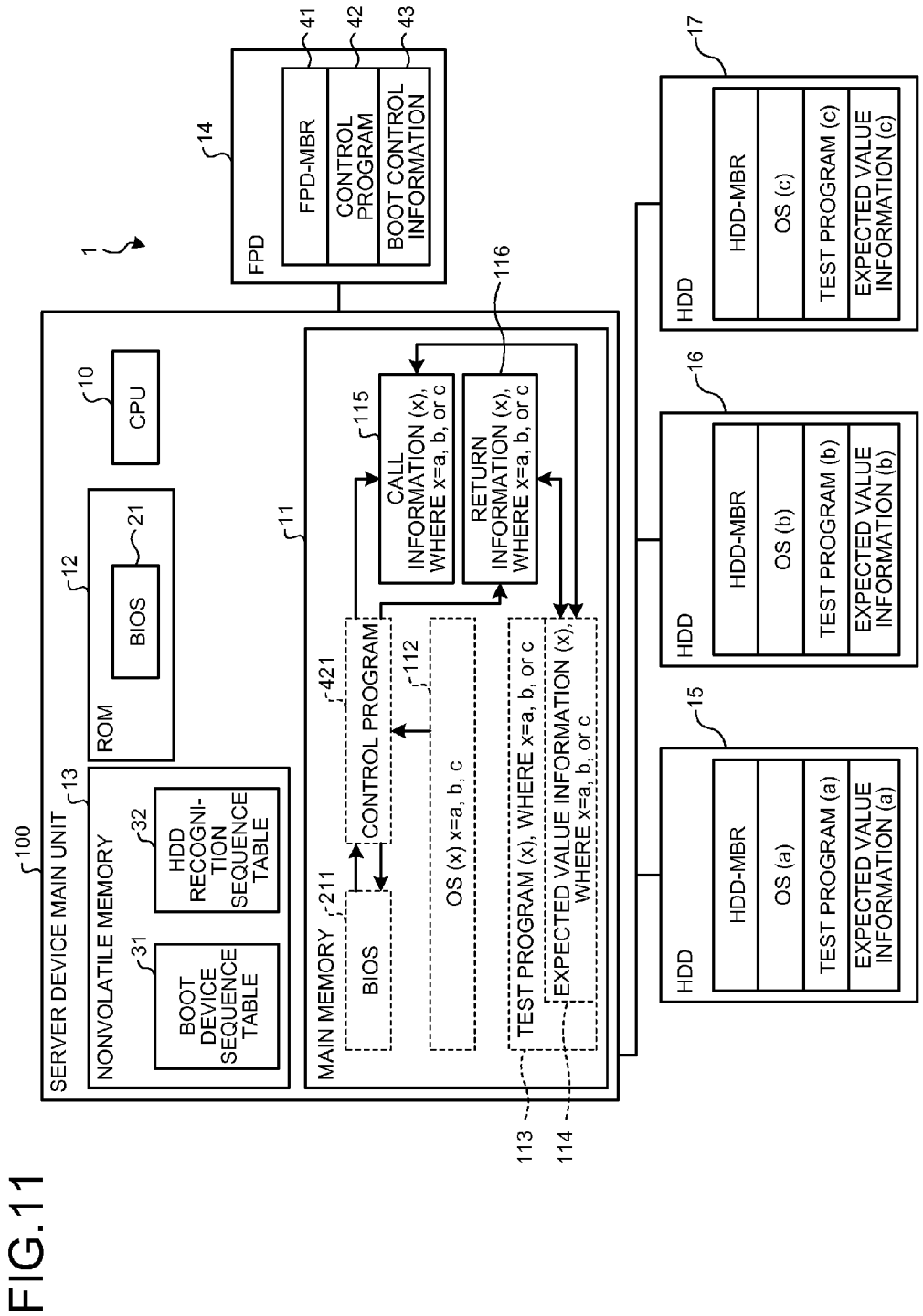
FIG. 11 is a diagram for explaining a procedure performed through hardware units and computer programs of a server device according to the first embodiment.

With reference to FIG. 11, a description will further be made of a procedure in accordance with the hardware configuration and a computer program configuration of the server device 1. FIG. 11 is a diagram for explaining a procedure performed through the hardware units and computer programs of the server device according to the first embodiment. Computer programs enclosed by dotted lines in FIG. 11 indicate the computer programs loaded in the main memory.

FIG. 11 illustrates only the hardware units of the server device 1 that are used in the description here. In FIG. 11, the hardware units except the external storage devices such as the FPD 14 and the HDDs 15 to 17 are collectively referred to as a server device main unit 100. Although, for convenience of explanation, the process may be described below as being performed by the computer programs, the process is actually performed by the CPU 10 through execution of the programs. The HDD 15 stores therein an OS (a), a test program (a), and expected value information (a). The HDD 16 stores therein an OS (b), a test program (b), and expected value information (b). The HDD 17 stores therein an OS (c), a test program (c), and expected value information (c).

First, the server device 1 is powered on. Then, the CPU 10 reads the BIOS 21 of the ROM 12, and loads the BIOS 21 as a BIOS 211 in the main memory 11. Thereafter, the BIOS 211 checks the boot device sequence table 31 stored in the nonvolatile memory 13, and determines the FPD 14 as the device to boot first. The BIOS 211 also checks the connected HDDs 15 to 17 to acquire the number of bootable HDDs. The BIOS 211 also acquires the HDD recognition sequence table 32 from the nonvolatile memory 13 such as CMOS.

Then, the BIOS 211 reads the FPD-MBR 41 of the FPD 14, then loads the FPD-MBR 41 as an FPD-MBR (not illustrated) in the main memory 11, and transfers control to the FPD-MBR loaded in the main memory 11. The FPD-MBR loaded in the main memory 11 reads the control program 42 from the FPD 14, then loads the control program 42 as a control program 421 in the main memory 11, and transfers control to the control program 421.

The control program 421 checks the boot control information 43 of the FPD 14 to determine whether booting is to be performed for the first time. If booting is to be performed for the first time, the control program 421 acquires, from the BIOS 211, the HDD information including the number of bootable HDDs and the HDD recognition sequence table 32. The control program 421 registers the acquired HDD information into the boot control information 43 of the FPD 14.

Then, the control program 421 requests the BIOS 211 to set the order of recognition of the HDD recognition sequence table 32 in the nonvolatile memory 13 to be the same as that of the HDD recognition priority table of the boot control information 43. The BIOS 211, in turn, changes the order of recognition of HDDs in the HDD recognition sequence table 32 so as to be the same as that of the HDD recognition priority table of the boot control information 43.

The control program 421 changes the boot mode flag of the boot control information 43 to 1. The control program 421 then reboots the server device 1 to reflect the change in the order of recognition of the HDD recognition sequence table 32.

After the reboot, the control program 421 checks the HDD recognition sequence table written in the boot control information 43, and acquires information of an HDD having the highest boot priority as that of the HDD to boot. A case will be described here in which the HDD 15 is the HDD to boot.

In the boot from the HDD to boot, the control program 421 changes the address of the interrupt vector from the address of the BIOS process to the address of its own process.

Then, the control program 421 reads the HDD-MBR 51 from the HDD 15, then loads the HDD-MBR 51 as an HDD-MBR (not illustrated) in the main memory 11, and transfers control to the loaded HDD-MBR. The HDD-MBR loaded in the main memory 11 reads the OS stored in the HDD 15, and loads the OS as an OS 112 in the main memory 11. Then, the control program 421 transfers control to the OS 112. Here, the control program 421 loads the OS (a) in the main memory 11 because the HDD 15 is the HDD to boot. FIG. 11 represents the OS as OS (x) (x=a, b, or c) to express that any one of the OSs (a), (b), and (c) is loaded.

The OS 112 executes the boot process. While the OS 112 is executing the boot process, the control program 421 acquires call information 115 and return information 116 in the calls of the BIOS processes by the OS, and stores those pieces of information in the main memory 11. FIG. 11 represents the call information and the return information as call information (x) and return information (x) (x=a, b, or c) to express that they are call information and return information corresponding to any one of the OSs (a), (b), and (c).

After the boot of the OS 112 is completed, the OS 112 uses an automatic program start function to read the test program (a) and the expected value information (a) from the HDD 15 whose OS 112 has been booted. Then, the OS 112 loads the test program (a) as a test program 113 in the main memory 11. At this time, the expected value information (a) is loaded in the main memory 11 as expected value information 114 that is parameters used in the process of the test program (a). FIG. 11 represents the test program and the expected value information as test program (x) and expected value information (x) (x=a, b, or c) to express that they are a test program and expected values corresponding to any one of the OSs (a), (b), and (c).

The test program 113 compares the expected value information held by itself with the call information 115 and the return information 116. The test program 113 records results of the comparison as the comparison result log in the HDD 15 or the like. If a mismatch occurs in the comparison, the test program 113 aborts the process. If no mismatch occurs in the comparison, the test program 113 performs a reboot.

After the reboot, the BIOS 211 loads the FPD-MBR 41 (not illustrated) in the main memory 11, and transfers control to the loaded FPD-MBR 41. The FPD-MBR 41 loaded in the memory loads the control program 42 as the control program 421 in the main memory 11. The control program 421 checks the boot control information 43 to check whether a regression test is completed on the OSs installed on all of the bootable HDDs (HDDs 15 to 17 in the present embodiment) that are connected. If any of the OSs has not been subjected to a regression test, the control program 421 repeats the regression test. If the regression test is completed on all the OSs, the control program 421 terminates the process.

Although, in the present embodiment, the regression test is terminated when the regression test has been conducted once on each of the bootable HDDs, the regression test may be conducted any number of times. The number of iterations of the test is specified by the number of successive boots in the boot control information 43. Specifically, the control program 421 increments the number of boots by one each time the regression test is completed on all of the bootable HDDs. When the number of boots coincides with the number of successive boots, the control program 421 determines that the regression test is completed, and terminates the process.

Figure 12:
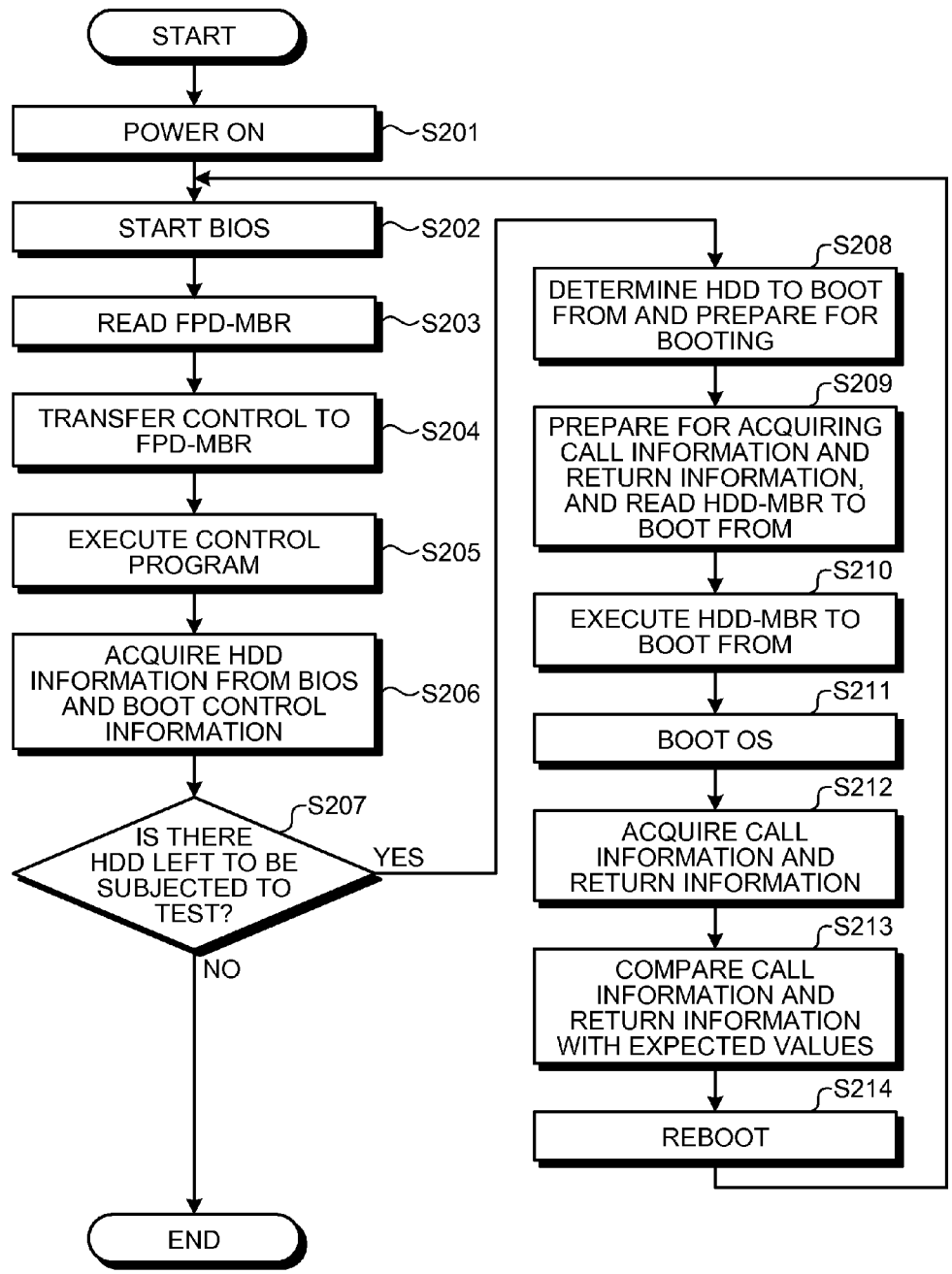
FIG. 12 is a flowchart of an overall process in a regression test according to the first embodiment.

A description will next be made of an overall process in a regression test according to the present embodiment, with reference to FIG. 12. FIG. 12 is a flowchart of the overall process in the regression test according to the first embodiment. The description will be made here assuming that the hardware units and the computer programs in FIG. 11 mainly operate the process.

The server device 1 is powered on (Step S201).

The CPU 10 loads the BIOS 21 as the BIOS 211 in the main memory 11, and starts booting (Step S202). The BIOS 211 reads the FPD-MBR 41 from the FPD 14 (Step S203). The BIOS 211 then loads the FPD-MBR 41 in the main memory 11, and transfers control to the loaded FPD-MBR 41 (Step S204).

The FPD-MBR 41 loaded in the main memory 11 reads the control program 42 from the FPD 14, then loads the control program 42 as the control program 421 in the main memory 11, and executes the control program 421 (Step S205).

The control program 421 acquires the HDD information from the BIOS 211 and the boot control information 43 (Step S206).

The control program 421 checks whether any HDD is left to be subjected to the regression test (Step S207). If no HDD is left to be subjected to the regression test (No at Step S207), the server device 1 terminates the process of the regression test.

If any HDD is left to be subjected to the regression test (Yes at Step S207), the control program 421 checks the boot control information 43 to determine the HDD to boot. Then, the control program 421 performs preparation, such as setting of the HDD boot mode flag, for booting from the HDD whose booting has been determined to be performed (Step S208).

The control program 421 performs further preparation, such as changing of the address of the interrupt vector, for acquiring the call information and the return information in the call of the BIOS. Furthermore, the control program 421 reads an HDD-MBR from the HDD to boot (Step S209). Then, the control program 421 loads the read HDD-MBR in the main memory 11, and executes the loaded HDD-MBR (Step S210).

The HDD-MBR loaded in the main memory 11 reads an OS from the HDD to boot, then loads the OS as the OS 112 in the main memory 11, and boots the OS 112 (Step S211).

The control program 421 acquires the call information and the return information used when the OS 112 calls a function of the BIOS 211 (Step S212).

After the boot is completed, the OS 112 calls a test program from the HDD to boot, and loads the test program as the test program 113 that includes the expected value information 114. The test program 113 compares the call information and the return information with the expected values thereof (Step S213). The test program 113 then registers results of the comparison as the comparison result log into the HDD to boot.

The test program 113 reboots the server device 1 (Step S214). The rebooted server device 1 returns to Step S202.

Figure 13:
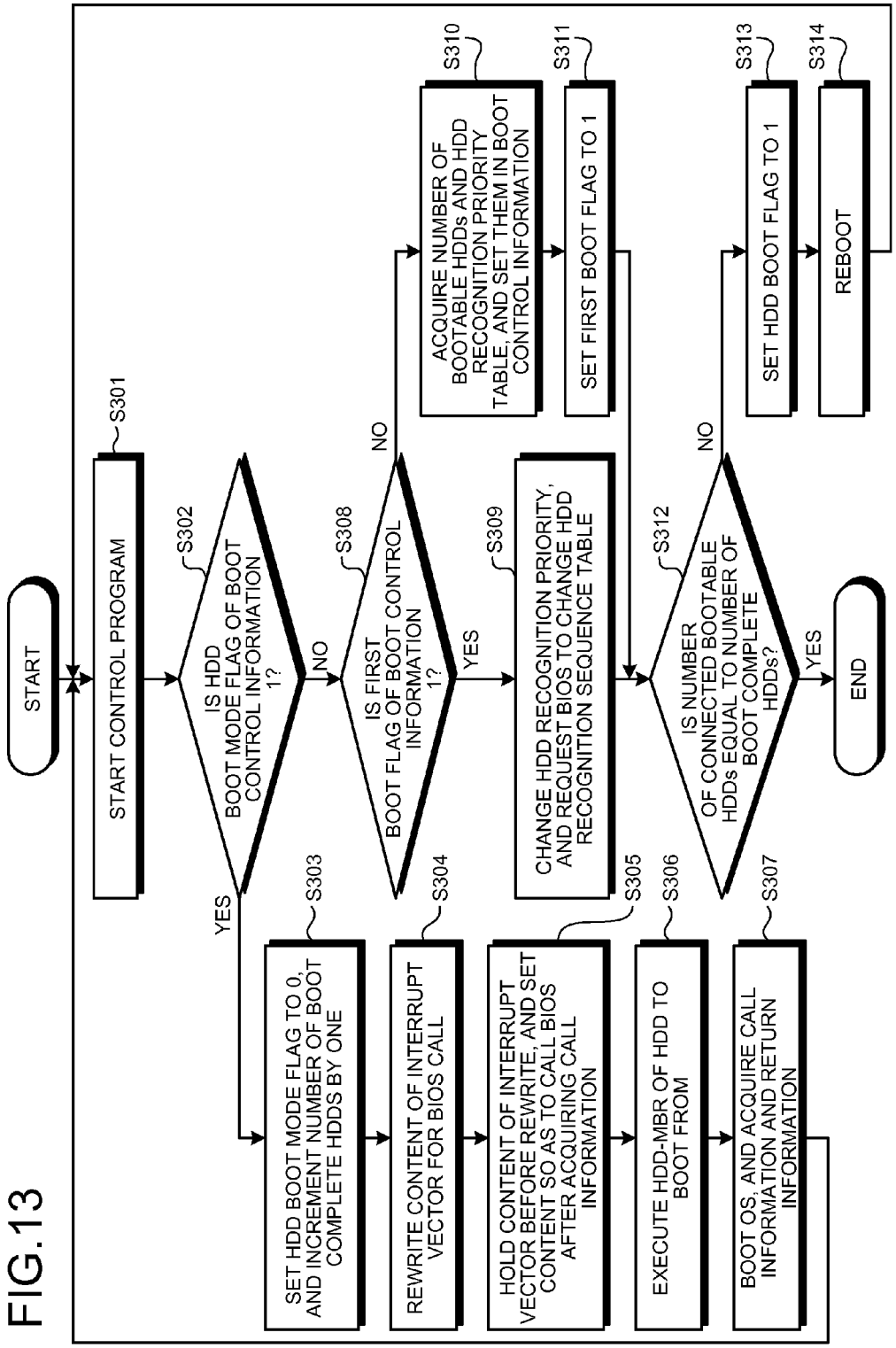
FIG. 13 is a flowchart of a process to boot OSs with an HDD to boot being sequentially switched in the first embodiment.

With reference to FIG. 13, a description will next be made of a process in which the control program boots the OSs with the HDD to boot being sequentially switched. FIG. 13 is a flowchart of the process to boot the OSs with the HDD to boot being sequentially switched in the first embodiment.

The control program 421 is started (Step S301).

The control program 421 checks whether the HDD boot mode flag of the boot control information 43 in the FPD 14 is 1 (Step S302). If the HDD boot mode flag is 1 (Yes at Step S302), the control program 421 sets the HDD boot mode flag of the boot control information 43 to 0. The control program 421 then increments the number of boot complete HDDs by one (Step S303).

Then, the control program 421 rewrites the content of the interrupt vector for the OS to call the BIOS to the address of the process that acquires the call information and the return information (Step S304).

The control program 421 also holds the content of the interrupt vector before being rewritten, and sets the content so that the BIOS call can be made after the process of acquiring the call information is finished (Step S305).

The control program 421 executes the HDD-MBR of the HDD to boot (Step S306).

The OS executes the boot process. The control program 421 acquires the call information and the return information (Step S307). After the boot of the OS is completed, the control program 421 returns to Step S301.

If the HDD boot mode flag is 0 (No at Step S302), the control program 421 determines whether the first boot flag of the boot control information 43 is 1 (Step S308). If the first boot flag is 1 (Yes at Step S308), the control program 421 changes the HDD recognition priority of the boot control information 43. The control program 421 then requests the BIOS 211 to change the content of the HDD recognition sequence table 32 to the HDD recognition priority set by the control program 421 (Step S309). The BIOS 211 changes the priority in the HDD recognition sequence table 32 to the value thus specified.

If the first boot flag is 0 (No at Step S308), the control program 421 acquires the number of bootable HDDs and the HDD recognition sequence table 32 from the BIOS 211. Then, the control program 421 sets the number of bootable HDDs and the HDD recognition priority table in the boot control information 43 (Step S310). Then, the control program 421 sets the first boot flag of the boot control information 43 to 1 (Step S311).

Then, the control program 421 determines whether the number of connected bootable HDDs coincides with the number of boot complete HDDs in the boot control information 43 (Step S312). If the number of connected bootable HDDs does not coincide with the number of boot complete HDDs (No at Step S312), the control program 421 sets the HDD boot mode flag of the boot control information 43 to 1 (Step S313). Thereafter, the control program 421 reboots the server device 1 (Step S314), and returns to Step S301.

If the number of connected bootable HDDs coincides with the number of boot complete HDDs (Yes at Step S312), the control program 421 terminates the process.

Figure 14:
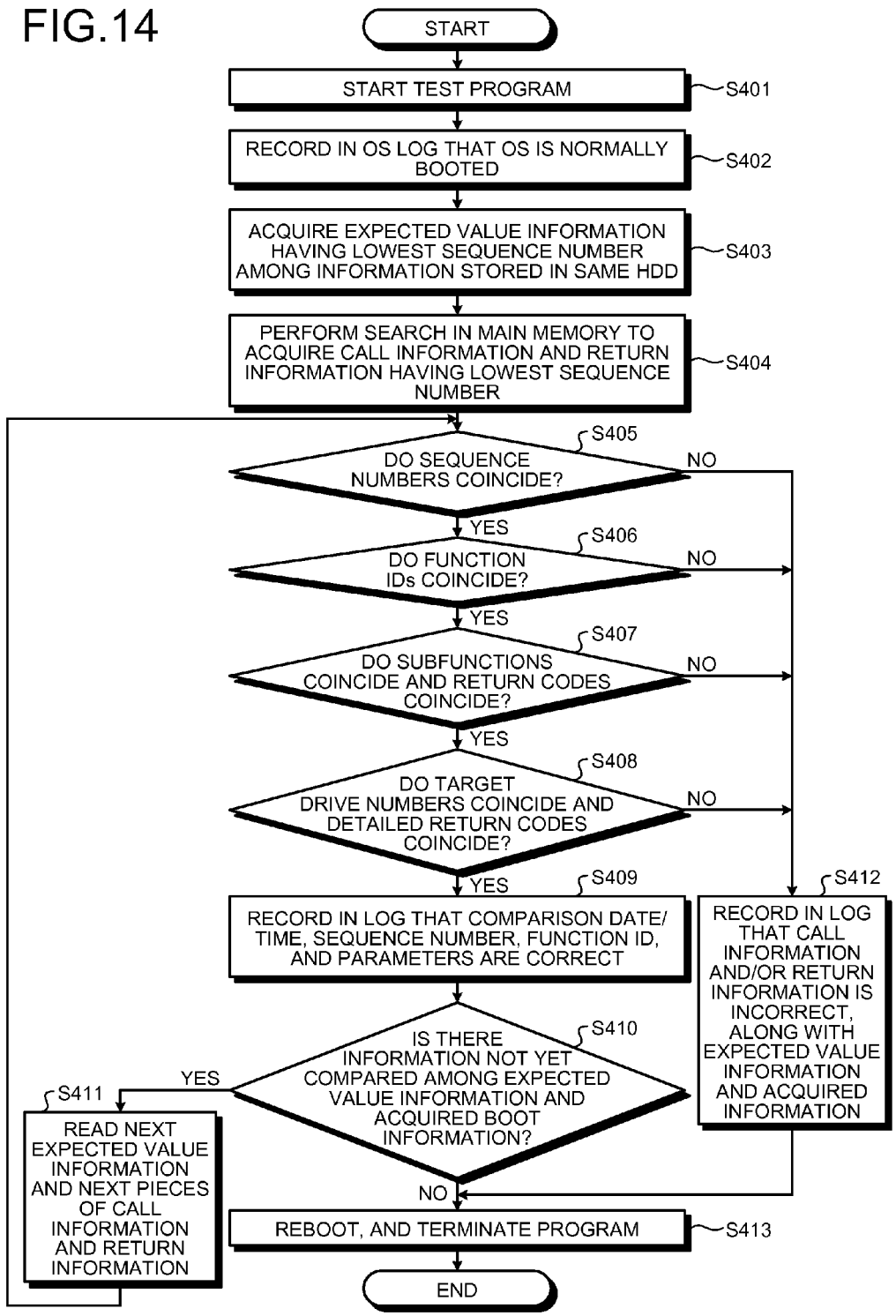
FIG. 14 is a flowchart of a process performed by a test program.

A description will next be made of the process performed by the test program 113, with reference to FIG. 14. FIG. 14 is a flowchart of the process performed by a test program.

The OS starts the test program 113 (Step S401).

The test program 113 records in a log of the OS that has started the test program 113 that the OS has been normally booted (Step S402).

The test program 113 acquires a piece of the expected value information having the lowest sequence number among pieces of the expected value information stored in the HDD storing the OS that has started the test program 113 (Step S403).

Then, the test program 113 performs a search in the main memory 11 to acquire call information and return information having the lowest sequence number (Step S404).

The test program 113 determines whether the sequence number of the expected value information coincides with the sequence number of the call information and the return information (Step S405).

If the sequence numbers coincide with each other (Yes at Step S405), the test program 113 determines whether the called function ID of the expected value information coincides with the called function ID of the call information and the return information (Step S406).

If the function IDs coincide with each other (Yes at Step S406), the test program 113 determines whether the subfunctions of the expected value information and the call information coincide with each other, and whether the return codes of the expected value information and the return information coincide with each other (Step S407).

If the subfunctions coincide with each other and the return codes coincide with each other (Yes at Step S407), the test program 113 determines whether the target drive numbers of the expected value information and the call information coincide with each other, and whether the detailed return codes of the expected value information and the return information coincide with each other (Step S408).

If the target drive numbers coincide with each other and the detailed return codes coincide with each other (Yes at Step S408), the test program 113 records in the log that the date and time of comparison, the sequence number, the called function ID, and the parameters are correct (Step S409).

Then, the test program 113 determines whether there is any piece of information that has not been compared among the pieces of expected value information stored in the HDD and among the pieces of call information and return information (Step S410). If there is any piece of information that has not been compared (Yes at S410), the test program 113 reads the next piece of expected value information and the next pieces of call information and return information (Step S411), and returns to Step S405.

If any pair of the sequence numbers, the called function IDs, the subfunctions, the return codes, the target drive numbers, and the detailed return codes do not coincide with each other (No at Step S405, S406, S407, or S408), the test program 113 proceeds to Step S412. Specifically, the test program 113 records in the log that one or both of the call information and the return information are incorrect. The test program 113 also records, in the log, the call information and the return information that have been acquired, and the expected value information corresponding to them (Step S412).

If there is no piece of information that has not been compared (No at S410), or after Step S412, the test program 113 reboots the server device 1, and terminates (Step S413).

Figure 15:
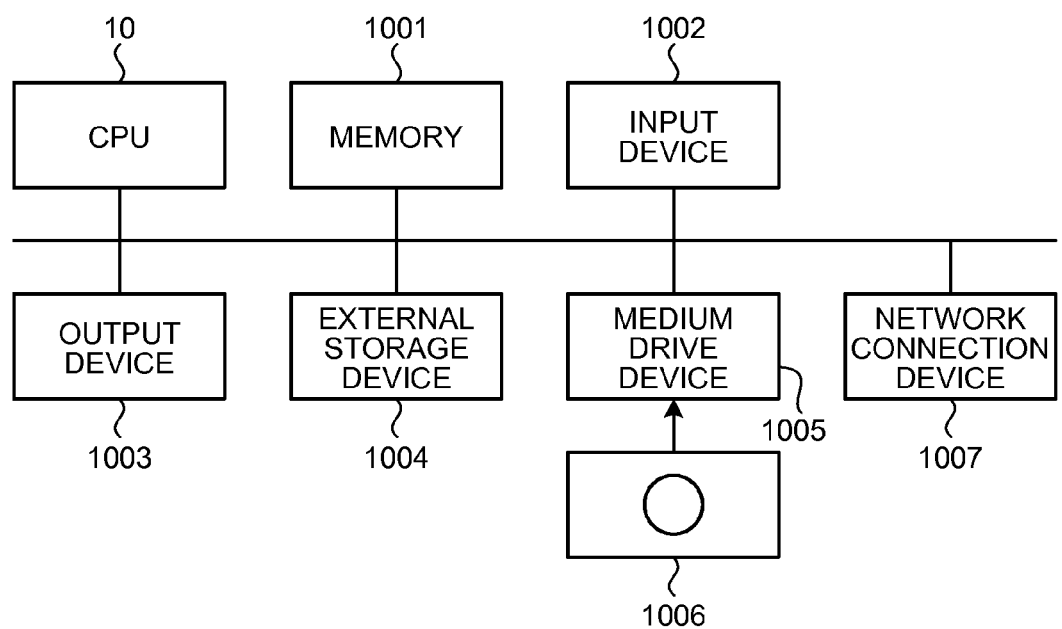
FIG. 15 is a schematic diagram of an overall hardware configuration of the server device according to the first embodiment.

FIG. 15 is a schematic diagram of an overall hardware configuration of the server device according to the present embodiment. As illustrated in FIG. 15, the server device 1 includes the CPU 10, a memory 1001, an input device 1002, an output device 1003, an external storage device 1004, a medium drive device 1005, and a network connection device 1007.

The CPU 10 performs the above-described processes by executing the computer programs using the memory 1001.

The memory 1001 includes the main memory 11, the ROM 12, and the nonvolatile memory 13. The memory 1001 stores therein the computer programs, data, etc. for executing the above-described processes.

The input device 1002 is, for example, a keyboard, a pointing device, and/or a touch panel. The input device 1002 is used for input of instructions from an operator. The input device 1002 is also used for driving a portable recording medium to input a record content in the medium. The computer programs and the data mentioned above can be stored in the portable recording medium, and be loaded into the memory as needed to be used.

The output device 1003 is, for example, a monitor.

The external storage device 1004 is, for example, a magnetic disk unit, an optical disc unit, and/or a magneto-optical disc unit. The magnetic disk unit is, for example, the HDDs 15 to 17. The computer programs and the data mentioned above can be stored in the external storage device 1004, and be loaded into the memory as needed to be used.

The medium drive device 1005 drives a portable recording medium 1006 and accesses a record content thereof. As the portable recording medium 1006, any computer-readable recording medium can be used, such as a memory card, an FPD, a compact disc read-only memory (CD-ROM), an optical disc, and a magneto-optical disc. The computer programs and the data mentioned above can be stored in the portable recording medium 1006, and be loaded into the memory as needed to be used. The FPD 14 of FIG. 1 illustrates a state in which, for example, an FPD serving as the portable recording medium 1006 is inserted in an FPD drive serving as the medium drive device 1005. Although the present embodiment has been described by way of the example in which the FPD is used as the portable recording medium 1006, another portable recording medium can be used. Furthermore, instead of using a portable recording medium, the MBR, the control program and the boot control information can be stored in an HDD, which, in turn, can perform the same operation as that of the FPD in the embodiment. The MBR, the control program and the boot control information can also be externally acquired via a network, and be used to perform the same operation as in the case of the FPD in the embodiment.

The network connection device 1007 communicates with external devices via any desired networks (transmission lines or transmission media) such as a local area network (LAN) and/or a wide area network (WAN), and performs data conversion associated with communication.

As described above, the information processing device according to the present embodiment automatically switches the hard disks to boot the different OSs stored on the hard disks, and automatically tests the calls of the BIOS by each of the OSs. This allows the operator who checks the correction of the BIOS to sequentially boot the different OSs without switching the hard disks by physically replacing the hard disks or changing the setting of the BIOS. This can reduce an effort of the operator in the regression test. Moreover, the operator need not perform the check watching the state of the calls of the BIOS while the OSs boot. This can also reduce the effort of the operator in the regression test, thus enabling more efficient work. In addition, even a nonspecialist can determine whether the comparison result is OK.

Furthermore, using the server device according to the present embodiment makes it possible to distinguish a failure in a BIOS provided by the manufacturer of the server device from a failure in an extended BIOS provided by another hardware vendor. For example, an OS is booted from a hard disk connected to a hard disk controller supplied by the manufacturer of the server device, and then an OS is booted from a hard disk connected to a hard disk controller provided from the other hardware vendor. If a mismatch occurs in the results of comparison of boot information only in the boot from the hard disk connected to one of the controllers, it is found the BIOS of that particular controller causes the failure.

[b] Second Embodiment

Figure 16:
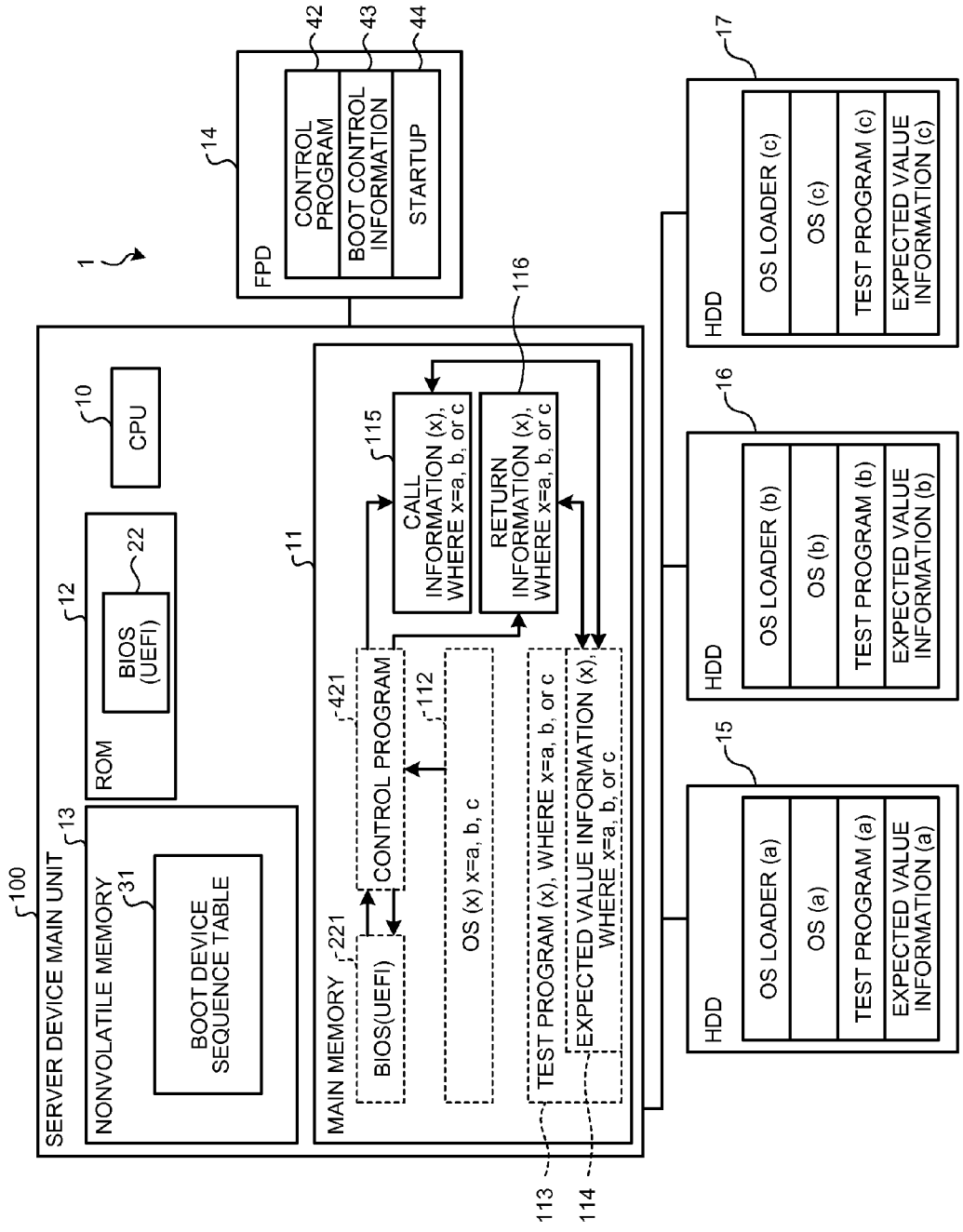
FIG. 16 is a diagram for explaining a procedure performed through hardware units and computer programs of a server device according to a second embodiment of the present invention.

FIG. 16 is a diagram for explaining a procedure performed through hardware units and computer programs of a server device according to a second embodiment of the present invention. Computer programs enclosed by dotted lines in FIG. 16 indicate the computer programs loaded in the main memory. Units in FIG. 16 having the same numerals as those in FIG. 11 have the same functions unless otherwise explained.

Unlike the case of the first embodiment, this server device 1 according to the present embodiment includes a BIOS 22 that is compliant with the Unified Extensible Firmware Interface (UEFI). When the BIOS 22 is installed on the server device 1, OSs supporting the UEFI are used. The HDDs 15 to 17 of FIG. 16 store therein the OSs supporting the UEFI. The HDDs 15 to 17 store therein OS loaders instead of the HDD-MBRs, unlike the OSs of the first embodiment. The FPD 14 stores therein a startup 44 instead of the FPD-MBR 41 of the first embodiment. The startup 44 is a computer program that is started first, by the BIOS 22, after the power is turned on.

FIG. 17 is a diagram illustrating examples of items and descriptions thereof listed in boot control information according to the second embodiment. The server device 1 according to the present embodiment includes the items illustrated in FIG. 17 as the boot control information. The boot control information according to the present embodiment is information obtained by removing the HDD boot mode flag from the boot control information in the case of the first embodiment.

After the server device 1 is powered on, the CPU 10 loads the BIOS 22 as a BIOS 221 in the main memory 11, and transfers control to the BIOS 221. The BIOS 221 reads the boot device sequence table 31 stored in the nonvolatile memory 13, and, using a function to automatically start an extensible firmware interface (EFI) shell defined in the UEFI, reads the startup 44 from the FPD 14. The startup 44 reads the control program 42 from the FPD 14. Then, the startup 44 loads the control program 42 as the control program 421 in the main memory 11, and transfers control to the control program 421. A detailed description will be made here of the loading of the control program 42 by the BIOS 221.

FIG. 18 is a diagram of an example of the boot device sequence table in the OS that supports the UEFI. The boot device sequence table 31 used by the BIOS 221 is a table such as the one illustrated in FIG. 18. As illustrated in FIG. 18, the boot device sequence table 31 in the present embodiment lists the hard disks as boot devices 401. The BIOS 221 first starts, for example, the EFI shell as the first device of the boot device sequence table 31. When the BIOS 221 issues an exit command in that state, the EFI shell is terminated, and booting starts from the subsequent boot device (HDD 15 in FIG. 18).

The BIOS 221 searches for the startup 44 stored in the FPD 14. The BIOS 221 then loads the startup 44 (not illustrated) stored in the FPD 14 in the main memory 11, and transfers control to the loaded startup 44. The process of the startup is a simple shell program. The loaded startup 44 reads the control program 42, and loads the control program 42 as the control program 421 in the main memory 11.

Figure 19:
FIG. 19 is a diagram for explaining a change in priority in an HDD recognition priority table according to the second embodiment.

At the time of the first boot, the control program 421 acquires the number of bootable HDDs and the boot device sequence table 31 from the BIOS 221. The control program 421 then registers the acquired number of bootable HDDs into the boot control information 43. The control program 421 further registers information of the acquired boot device sequence table 31 into the HDD recognition priority table of the boot control information 43. FIG. 19 is a diagram for explaining a change in priority in the HDD recognition priority table according to the second embodiment. A table 402 of FIG. 19 represents the state in which the information of the boot device sequence table 31 acquired by the control program 42 is registered in the HDD recognition priority table of the boot control information 43. In the table 402, the priority is higher leftward as viewed facing FIG. 19. In other words, in the table 402, the HDD 15 on the most left side is the device having the highest boot priority.

The control program 421 determines the HDD to boot, using the HDD recognition priority table of the boot control information 43.

Here, the OS loader and/or the OS executes, for example, reading from the HDD by making a protocol call of a function of the BIOS 221. Specifically, the present embodiment uses the call information and the return information when the OS loader and/or the OS makes a protocol call of a function of the BIOS 221. In the protocol call, the OS loader and/or the OS uses a protocol processing table, and calls a process corresponding to an address listed in the protocol processing table.

Therefore, the control program 421 changes the address specified on the protocol processing table to the address of the process that acquires the boot information and that calls the process of the BIOS 221. Thereafter, the control program 421 calls the OS loader stored in the determined HDD, and loads the OS loader in the main memory 11. The OS loader loaded in the main memory 11, in turn, boots the OS. After the regression test of the OS is completed, a reboot is performed, and the control program 421 is started.

The control program 421 changes the HDD recognition priority table of the boot control information 43 from the state of the table 402 to the state of a table 403.

Then, the control program 421 acquires the call information and the return information in the booting of the OS. The control program 421 then determines the HDD to boot, using the information of the table 403, and starts a boot of an OS from the next HDD.

Then, the control program 421 checks the boot control information 43, and determines whether the regression test is completed on all of the bootable HDDs. If the number of bootable HDDs coincides with the number of boot complete HDDs in the boot control information 43, the control program 421 determines that the regression test is completed on all of the bootable HDDs.

Thereafter, the test program 113 loaded in the main memory 11 by the OS compares the acquired boot information with the expected value information thereof, and registers the results of the comparison into the log of the OS.

Figure 20:
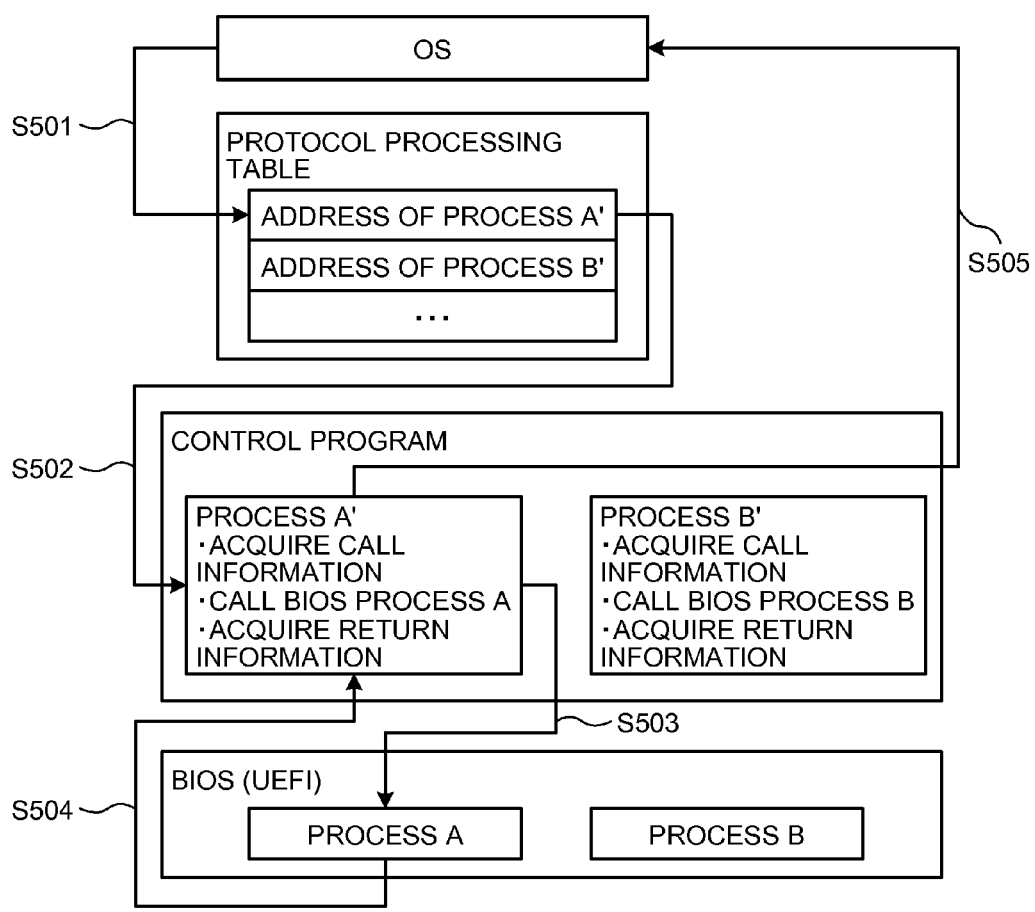
FIG. 20 is a diagram for explaining an example of an acquisition process of the call information and the return information in the second embodiment.

Here, with reference to FIG. 20, a description will be made of the acquisition of the call information and the return information in the call of the BIOS 221 by the OS. FIG. 20 is a diagram for explaining an example of the acquisition process of the call information and the return information in the second embodiment. Portions enclosed by solid-line rectangles in FIG. 20 represent objects that operate and processes performed by the objects. FIG. 20 illustrates a case in which an OS calls the process A serving as a function of the BIOS. In the description below, for convenience of explanation, the computer programs (such as the OS) directly give and receive data and instructions to/from each other. However, the data and the instructions are actually given and received between the programs via the CPU 10.

First, an OS executes a boot process, and, while executing the boot process, calls the process A that executes a function of the BIOS. Specifically, the OS calls the process A by making a protocol call to the BIOS. There is a protocol processing table for the OS to make the protocol call. The protocol processing table lists an address of the BIOS process called by the OS. In other words, the OS performs the call so as to transfer control to the process specified by the address listed in the protocol processing table (Step S501). Here, the control program rewrites the address of the process of the BIOS 221 preset in the protocol processing table to an address of a process to acquire the boot information and to call the process of the BIOS. In this case, the control program rewrites the address to the address of the process A' as a process corresponding to the called process A.

To call the process A, the OS refers to the address in the protocol processing table corresponding to the specified protocol call. As described above, the address of the process A of the protocol processing table is changed to that of the process A'. Therefore, the OS acquires the address of the process A' listed in the protocol processing table, corresponding to the protocol call of the process A. Then, the OS determines that the acquired address points to the process A' of the control program, and transfers control to the process A' of the control program (Step S502).

Then, the control program executes its own process A'. This process A' includes the acquisition of the call information, the call of the BIOS process A, and the acquisition of the return information. Here, the process A' executed by the control program performs an operation from a step of acquiring the call information to a later step of calling the BIOS process A (Step S503).

The BIOS executes the called process A. After the process A is completed, the BIOS sends the return information to the process A' of the control program (Step S504).

The process A' of the control program acquires the return information received from the BIOS. Furthermore, the process A' of the control program sends the return information thereof to the OS, and transfers control to the OS, which, in turn, continues the boot process (Step S505).

A description will next be made of an overall process in a regression test according to the present embodiment, with reference to FIG. 21. FIG. 21 is a flowchart of the overall process in the regression test according to the second embodiment. The description will be made here assuming that the hardware units and the computer programs in FIG. 16 mainly operate the process.

The control program 421 is started (Step S601).

The control program 421 determines whether the first boot flag of the boot control information 43 is 1 (Step S602). If the first boot flag is 1 (Yes at Step S602), the control program 421 changes the priority in the HDD recognition priority table of the boot control information 43 (Step S603).

If the first boot flag is 0 (No at Step S602), the control program 421 acquires the number of bootable HDDs and the boot device sequence table 31 from the BIOS 221. Then, the control program 421 sets the number of bootable HDDs and the HDD recognition priority table in the boot control information 43 (Step S604). Then, the control program 421 sets the first boot flag of the boot control information 43 to 1 (Step S605).

Then, the control program 421 determines whether the number of connected bootable HDDs coincides with the number of boot complete HDDs in the boot control information 43 (Step S606). If the number of connected bootable HDDs does not coincide with the number of boot complete HDDs (No at Step S606), the control program 421 increments the number of boot complete HDDs by one (Step S607).

Then, the control program 421 rewrites the content of the protocol processing table for the OS to call the BIOS to the address of the process that acquires the call information and the return information (Step S608).

The control program 421 also holds the content of the protocol processing table before being rewritten, and sets the content so that the BIOS call can be made after the process of acquiring the call information and the return information is finished (Step S609).

The control program 421 reads the OS loader in the HDD to boot, and executes the OS (Step S610).

The OS executes the boot process. The control program 421 acquires the call information and the return information (Step S611). After the boot of the OS is completed, the control program 421 returns to Step S601.

If the number of connected bootable HDDs coincides with the number of boot complete HDDs (Yes at Step S606), the control program 421 terminates the process.

As described above, the information processing device according to the present embodiment uses the BIOS compliant with the UEFI, and still can obtain the same effect as that of the first embodiment.

According to an aspect of an information processing device and a method for controlling an information processing device disclosed herein, an effect is brought about that an effort of an operator is reduced in regression tests.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An information processing device comprising:
    a processor;
    a basic input/output system (BIOS) storage unit that stores therein a BIOS; and
    an operating system (OS) storage unit that stores therein a plurality of OSs;
    wherein the processor is programmed with instructions that implement:
    a boot control unit that sequentially boots the OSs stored in the OS storage unit;
    a boot information acquisition unit that, when each of the OSs booted by the boot control unit starts up, acquires boot information transferred between the booted OS and the BIOS; and
    a regression analysis processing unit that compares the boot information acquired by the boot information acquisition unit with expected values which are predetermined values for the boot information to determine whether the boot information coincides with the expected values.

2. The information processing device according to claim 1, wherein
    the boot information includes call information that is sent to the BIOS when the OS booted by the boot control unit calls the BIOS, and includes return information that is sent to the called BIOS when the BIOS returns control, after performing processing, to the OS that has called the BIOS;
    the boot information acquisition unit comprises:
    a call information acquiring unit that acquires the call information; and
    a return information acquiring unit that acquires the return information; and
    the regression analysis processing unit compares the call information acquired by the call information acquiring unit with expected values of the call information, and compares the return information acquired by the return information acquiring unit with expected values of the return information, to determine whether each of the comparisons results in a coincidence.

3. The information processing device according to claim 1, wherein
the OSs are stored in separate hard disks; and
the boot control unit sequentially selects a hard disk to be used for booting among the hard disks, and sequentially boots the OS stored in the selected hard disk.

4. The information processing device according to claim 1, wherein
the OSs are stored in separate hard disks; and
the boot control unit stores an order of priorities of hard disks in which a hard disk having the highest priority is selected as a hard disk used for booting, and selects the hard disk used for booting by changing the order of priorities.

5. A method for controlling an information processing device, the method comprising:
sequentially booting operating systems (OSs) stored in an OS storage unit;
acquiring, when any of the OSs starts up, boot information transferred between the booted OS and a basic input/output system (BIOS); and
comparing the boot information with expected values that are predetermined values for the boot information to determine whether the boot information coincides with the expected values.

* * * * *